United States Patent
Covezzi et al.

(10) Patent No.: US 7,414,098 B2
(45) Date of Patent: Aug. 19, 2008

(54) GAS-PHASE CATALYTIC POLYMERIZATION OF OLEFINS

(75) Inventors: Massimo Covezzi, Ferrara (IT); Gerben Meier, Frankfurt (DE); Gabriele Mei, Ferrara (IT)

(73) Assignee: Basell Polioefine Italia S.p.A., Milan (IT)

( * ) Notice: Subject to any disclaimer, the term of this patent is extended or adjusted under 35 U.S.C. 154(b) by 298 days.

(21) Appl. No.: 10/530,597

(22) PCT Filed: Sep. 25, 2003

(86) PCT No.: PCT/EP03/10717

§ 371 (c)(1),
(2), (4) Date: Apr. 7, 2005

(87) PCT Pub. No.: WO2004/033505

PCT Pub. Date: Apr. 22, 2004

(65) Prior Publication Data

US 2006/0058474 A1 Mar. 16, 2006

Related U.S. Application Data

(60) Provisional application No. 60/418,836, filed on Oct. 15, 2002.

(30) Foreign Application Priority Data

Oct. 9, 2002 (EP) .................................. 02079251

(51) Int. Cl.
*C08F 2/34* (2006.01)
*B01J 19/24* (2006.01)
*C08F 10/02* (2006.01)

(52) U.S. Cl. ........................... 526/65; 526/67; 526/901; 526/918; 422/132; 422/139

(58) Field of Classification Search .................. 422/132, 422/139; 526/65, 918, 67, 901
See application file for complete search history.

(56) References Cited

U.S. PATENT DOCUMENTS 4,218,339 A 8/1980 Zucchini et al. ......... 252/429 B (Continued)

FOREIGN PATENT DOCUMENTS

EP 0089691 9/1983

(Continued)

OTHER PUBLICATIONS

D. Geldart, "Chapter 7—High Velocity Fluidized Beds," *Gas Fluidization Technology*, J. Wiley & Sons Ltd., p. 155-156 (1986).

*Primary Examiner*—Fred M Teskin
(74) *Attorney, Agent, or Firm*—Jarrod N. Raphael

(57) ABSTRACT

Process for the gas-phase catalytic polymerization of olefins carried out in a plurality of interconnected polymerization zones, the process comprising feeding one or more monomers to said polymerization zones in the presence of a catalyst under reaction conditions and collecting the polymer product from said polymerization zones, in which process the polymer particles grow within a first polymerization zone where a fluidized bed is formed, at least a part of said polymer particles leave said first polymerization zone to enter a second polymerization zone through which they flow downward, leave said second polymerization zone and enter a third polymerization zone through which they flow upward under fast fluidization or transport conditions, leave said third polymerization zone and are reintroduced into the first polymerization zone, thus establishing a circulation of polymer between the different polymerization zones.

29 Claims, 5 Drawing Sheets

U.S. PATENT DOCUMENTS

| | | | | |
|---|---|---|---|---|
| 4,302,566 | A | 11/1981 | Karol et al. | 526/125 |
| 4,399,054 | A | 8/1983 | Ferraris et al. | 252/429 B |
| 4,472,520 | A | 9/1984 | Zucchini et al. | 502/104 |
| 4,748,272 | A | 5/1988 | Youssefyeh | 562/471 |
| 5,139,985 | A | 8/1992 | Barbé et al. | 502/109 |
| 5,352,749 | A | 10/1994 | DeChellis et al. | 526/68 |
| 6,689,845 | B1 * | 2/2004 | Govoni et al. | 526/65 |

FOREIGN PATENT DOCUMENTS

| | | |
|---|---|---|
| EP | 0395083 | 10/1990 |
| EP | 0553805 | 8/1993 |
| EP | 0553806 | 8/1993 |
| EP | 0574821 | 12/1993 |
| EP | 0601525 | 6/1994 |
| EP | 0699213 | 3/1996 |
| WO | 9221706 | 12/1992 |
| WO | 9704015 | 2/1997 |
| WO | 9903902 | 1/1999 |
| WO | 0002929 | 1/2000 |
| WO | 0069552 | 11/2000 |
| WO | 0240146 | 5/2002 |
| WO | 0240547 | 5/2002 |
| WO | 0241986 | 5/2002 |

* cited by examiner

GAS-PHASE CATALYTIC POLYMERIZATION OF OLEFINS

This application is the U.S. national phase of International Application PCT/EP2003/010717, filed Sep. 25, 2003, claiming priority to European Patent Application 02079251.1, filed Oct. 9, 2002, and the benefit under 35 U.S.C. 119(e) of U.S. Provisional Application 60/418,836, filed Oct. 15, 2002; the disclosures of International Application PCT/EP2003/010717, European Patent Application 02079251.1 and U.S. Provisional Application 60/418,836, each as filed, are incorporated herein by reference.

The present invention relates to a process for the gas-phase catalytic polymerization, particularly for the polymerization of α-olefins, carried out in a plurality of interconnected polymerization zones to which one or more monomers are fed in the presence of a catalyst under polymerization conditions and from which the produced polymer is discharged.

The development of olefin polymerization catalysts with high activity and selectivity, particularly of the Ziegler-Natta type and, more recently, of the metallocene type, has led to the widespread use on an industrial scale of processes in which the polymerization of olefins is carried out in a gaseous medium in the presence of a solid catalyst.

A widely used technology for gas-phase polymerization processes is the fluidized-bed technology. In fluidized-bed gas-phase processes, the polymer is confined in a vertical cylindrical zone. The reaction gases exiting the reactor are taken up by a compressor, cooled and sent back, together with make-up monomers and appropriate quantities of hydrogen, to the bottom of the bed through a distributor. Entrainment of solid in the gas is limited by an appropriate dimensioning of the upper part of the reactor (freeboard, i.e. the space between the bed surface and the gas exit point), where the gas velocity is reduced, and, in some designs, by the interposition of cyclones in the exit gas line. The flow rate of the circulating gas is set so as to assure a velocity within an adequate range above the minimum fluidization velocity and below the "transport velocity". The heat of reaction is removed exclusively by cooling the circulating gas. The catalyst components may be fed continuously into the polymerization vessel. The composition of the gas-phase controls the composition of the polymer. The reactor is operated at constant pressure, normally in the range 1-6 MPa. The reaction kinetics is controlled by the addition of inert gases.

A significant contribution to the reliability of the fluidized-bed reactor technology in the polymerization of α-olefins was made by the introduction of suitably pre-treated spheroidal catalyst of controlled dimensions and by the use of propane as a diluent (see WO 92/21706). However, fluidized-bed technology has remarkable limits, some of which are discussed in detail below.

A) Molecular Weight Distribution

Since fluidized-bed reactors approximate very closely the ideal behaviour of a "continuous stirred-tank reactor" (CSTR), it is very difficult to obtain products which are a homogeneous mixture of different types of polymeric chains. In fact, the composition of the gaseous mixture that is in contact with the growing polymer particle is essentially the same for all the residence time of the particle in the reactor. As a consequence, one of the major limits of fluidized-bed processes is the difficulty of broadening the molecular weight distribution of the obtained polymers. It is generally known that, in the continuous polymerization of α-olefins in a single stirred stage (which also involves steady composition of the monomers and of the chain transfer agent, normally hydrogen) with Ti-based catalysts of the Ziegler-Natta type, polyolefins having a relatively narrow molecular weight distribution are obtained. This characteristic is even more emphasized when metallocene catalysts are used. The breadth of the molecular weight distribution has an influence both on the rheological behaviour of the polymer (and hence the processability of the melt) and on the final mechanical properties of the product, and is a feature which is particularly important for the (co)polymers of ethylene.

For the purpose of broadening the molecular weight distribution, processes based on several reactors in series, in each of which it becomes possible to operate at least at different hydrogen concentrations, have gained industrial importance. A problem typically encountered also with these processes, when a very broad molecular weight distribution is required, is an insufficient homogeneity of the product. Particularly critical is the homogeneity of the material in blow-molding processes and in the production of thin films, in which the presence of even small quantities of inhomogeneous material brings about the presence of unfused particles in the film ("fish eyes"). In patent application EP-574,821, a system of two reactors is proposed which operate at different polymerization conditions with mutual recirculation of polymer between the two. Even if the concept is suitable for solving the problem of the homogeneity of the product, as shown by the experimental results, such a system involves investment costs and a certain operational complexity.

In other cases, polymers of broad molecular weight distribution are obtained by the use of mixtures of different Ziegler-Natta catalysts in a single reactor, each catalyst being prepared so as to give a different response to hydrogen. It is clear that a mixture of granules each with its own individuality are obtained at the exit from the reactor. It is difficult to obtain homogeneity of the product by this route.

B) Removal of the Heat of Reaction

The maximum fluidization velocity is subjected to quite narrow limits. Depending on the heat of the reaction, the polymer dimensions and the gas density, a limit to the productivity of the reactor (expressed as hourly output per unit reactor cross-section) is inevitably reached, where operation with gas inlet temperatures higher than the dew point of the mixture of the gases is desired. This limit can lead to reductions in the plant output, in particular in the copolymerization of ethylene with higher α-olefins (hexene, octene), which is carried out with conventional Ziegler-Natta catalysts, requiring gas compositions rich in such olefins.

Many ways of overcoming the limits, in terms of heat removal, of the traditional technology have been proposed, based on partial condensation of the circulating gases and on the use of the latent heat of evaporation of the condensates for controlling the temperature in the interior of the reactor (see EP-89691, U.S. Pat. No. 5,352,749, EP 699 213). This technique is referred to as operation in the "condensing mode". By operating in the "condensing mode", the cooling capacity of the recycle stream is increased by both the vaporization of the condensed liquids entrained in the recycle stream and as a result of the greater temperature gradient between the entering recycle stream and the reactor. For instance, according to EP 699 213, after the cooling of the recycle stream at a temperature below its dew point, at least part of the condensed liquid is separated by the gas phase and introduced directly into the fluidized bed.

Also the specifications of WO 00/69552 and WO 02/40146 are addressed to improve the removal of heat from a fluidized bed reactor. According to these documents, it is possible to increase the liquid/gas ratio fed to a fluidized bed reactor when operating in the condensing mode. A specific fluidized bed reactor has been designed wherein the reaction zone is divided into two or more compartments by one or more substantially vertical partition walls extending from a point located above the gas distribution plate to a point located below the upper surface of the fluidized bed. Preferably, said partition walls have the shape of a pipe or a hollow section, which are concentric with the reaction zone. According to the teaching of WO 00/69552 and WO 02/40146, the presence of said partition walls submerged in the fluidized bed increases the amount of condensed liquid which can be supplied to the fluidized bed in proportion to the total amount of gas. Such a fluidized bed reactor is therefore able to increase the heat removal from the reaction zone when operating in the condensing mode, however no improvement is achieved as regards the ability of broadening the molecular weight distribution of the obtained polymers (as explained at the point A). In fact, also the specific fluidized bed reactor according to the above patents approximates very closely the ideal behaviour of a "continuous stirred-tank reactor" (CSTR), so that it is not possible to obtain products which are a homogeneous mixture of different types of polymeric chains. In fact, in the reactor described in WO 00/69552 and WO 02/40146 the composition of the gaseous mixture that is in contact with the growing polymer particle is essentially the same for all the residence time of the particle in the reactor.

Another polymerization process is disclosed in WO 00/02929. A process is provided for the catalytic polymerization of α-olefins in the gas-phase, carried out in at least two interconnected polymerization zones, said process comprising feeding one or more monomers to said polymerization zones in the presence of catalyst under reaction conditions and collecting the polymer product from said polymerization zones in such a way that a circulation of polymer is established between the successive polymerization zones. This process allows to broaden the molecular weight distribution of the obtained polymers, while at the same time maintaining a high homogeneity level. However, the process of WO 00/02929 involves the use of a novel type of polymerization apparatus and thus cannot be applied to a conventional fluidized bed reactor: this means that a conventional fluidized bed reactor cannot be retrofitted to carry out the process taught in said patent.

In view of the foregoing, it would thus be desirable to provide a polymerization process able to significantly broaden the molecular weight distribution of the obtained polymers maintaining a high homogeneity level, said polymerization process being easily feasible in a conventional fluidized bed reactor when suitably retrofitted.

The Applicant has surprisingly found that when the polymerization of α-olefins is carried out in a fluidized bed reactor provided with more interconnected polymerization zones wherein a circulation of polymer between said polymerization zones is established, it is possible to operate said polymerization zones with a different gaseous composition so obtaining a broadening of the molecular weight distribution, while at the same time maintaining maximum homogeneity of the product.

It is therefore an object of the present invention a process for the gas-phase catalytic polymerization of olefins carried out in a plurality of interconnected polymerization zones, the process comprising feeding one or more monomers to said polymerization zones in the presence of a catalyst under reaction conditions and collecting the polymer product from said polymerization zones, in which process the polymer particles grow within a first polymerization zone where a fluidized bed is formed, at least a part of said polymer particles leave said first polymerization zone to enter a second polymerization zone through which they flow downward, leave said second polymerization zone and enter a third polymerization zone through which they flow upward under fast fluidization or transport conditions, leave said third polymerization zone and are reintroduced into the first polymerization zone, thus establishing a circulation of polymer between the different polymerization zones.

The polymerization process of the present invention has many advantages, mainly due to the presence of distinct polymerization zones wherein different conditions of fluidization of polymer particles and monomers are established. This allows to easily differentiate the reaction conditions in said interconnected polymerization zones, so carrying out a polymerization process endowed with a high flexibility as regards both the molecular weight distribution and the homogeneity of the obtained products.

In the process of the invention the first polymerization zone can be set up in a fluidized bed reactor to which the gaseous monomer is fed through a distribution plate located below the fluidized bed. The polymer particles grow above the distribution plate, form a fluidized bed and are maintained in a fluidization state. This means that the velocity of the fluidizing gas is maintained well below the transport velocity of the polymer particles in order to avoid phenomena of solids entrainment and particle carryover to the region overtopping the fluidized bed.

Some polymer particles growing in the first polymerization zone enter the second polymerization zone. The inlet of the second polymerization zone is generally placed in the upper region of the first polymerization zone below the upper limit of the fluidized bed. In this second polymerization zone the growing polymer particles flow downward in a densified form under the action of gravity. High values of density of the solid (kg of polymer per $m^3$ of reactor occupied by polymer) approaching the bulk density of the polymer, are reached in said second polymerization zone: a positive gain in pressure can thus be obtained along the direction of flow.

According to the invention, the second polymerization zone can be arranged in different ways. For instance, it may be set up inside a vertical pipe, which is coaxial with the first polymerization zone. Throughout the present description the term "vertical" is intended to indicate both vertical pipes and pipes having a slight slope with respect to the vertical axes of the fluidized bed reactor.

In alternative, the second polymerization zone may be set up into a pipe running outside the first polymerization zone, the inlet of said pipe being directly connected to the upper region of said first polymerization zone. In another embodiment, the second polymerization zone may be set up into an annular chamber formed between the walls of a fluidized bed reactor and a vessel placed inside and coaxial with the fluidized bed reactor.

The third polymerization zone is generally set up into a pipe running outside the first polymerization zone and connecting the bottom of the second polymerization zone to the first polymerization zone. In said third polymerization zone, fast fluidization or transport conditions are imposed so that the polymer particles flow upward through said third polymerization and are then reintroduced into the first polymerization zone. Preferably, the polymer particles are reintroduced into the first polymerization zone at a point situated above the upper limit of the fluidized bed formed in the first polymerization zone. As it is known, the state of fast fluidization is obtained when the velocity of the fluidizing gas is higher than the transport velocity of the particles. The terms "transport velocity" and "fast fluidization state" are well known in the art; for a definition thereof, see, for example, "D. Geldart, Gas Fluidization Technology, page 155 et seqq., J. Wiley & Sons Ltd., 1986". Fast fluidization conditions can be established by feeding a gas through a line placed at the inlet of the third polymerization zone, said gas having the same direction of the polymer flow. Accordingly, it is possible to introduce the polymer particles into the third polymerization zone without the help of special mechanical means. The flow rate of said gas is such that in the third polymerization zone the gas superficial velocity is generally comprised between 0.5 and 15 m/s depending on the gas density and the particle size distribution.

In an another embodiment of the present invention it is also contemplated that a part of the polymer particles growing inside the fluidized bed of the first polymerization zone enters directly the third polymerization zone through a pipe connecting the lower region of the fluidized bed to the third polymerization zone.

As a consequence of the continuous movement of the polymer particles through the above defined polymerization zones, a "loop" circulation of polymer is set up along the successive polymerization zones. Said loop circulation is a consequence of the balance of pressures between the three polymerization zones and the head loss introduced into the system.

The process of the present invention is particularly suitable for the polymerization of one or more α-olefins $CH_2=CHR$, where R is hydrogen or a hydrocarbon radical having 1-12 carbon atoms.

According to a particularly advantageous embodiment of the present invention, the gas mixture present in the first polymerization zone can be partially prevented from entering the second polymerization zone. This effect can be achieved by introducing a gas and/or liquid mixture of a composition different from the mixture present in the first polymerization zone, through one or more introduction lines placed in the upper part of the second polymerization zone.

Similarly, the gas mixture present in the second polymerization zone can be partially prevented from entering the third polymerization zone by introducing a gas and/or liquid mixture of composition different from the mixture present in the second polymerization zone, through one or more introduction lines placed at the bottom of said second polymerization zone or at the inlet of the third polymerization zone.

According to the above embodiments, different working conditions can be established in each polymerization zone as regards the concentration of molecular weight regulator, monomer and comonomers. In such a way, polymeric chains with a different composition and/or a different average molecular weight can be obtained in the different polymerization zones of the invention, thus leading to obtain a final polymer having a broad molecular weight distribution (MWD) and/or homogeneous blends of polymers having a different composition. The gas mixture of different composition to be fed at the inlet of the second and/or third polymerization zone can also contain entrained droplets of liquid composed of liquefied gas, as it is customary when operating in the so-called "condensing mode". In the following description, even if not specified, it is intended that a gas phase or a gas mixture can contain a part of entrained liquid.

Preferably, the introduction of the gas mixture of different composition at the inlet of the second polymerization zone is such to establish a net gas flow upward at the upper limit of the second polymerization zone. The established flow of gas upward has the advantageous effect of preventing the gas mixture present in the first polymerization zone from entering the second polymerization zone.

The present invention is now described in detail with reference to the attached figures, which are given for illustrative purpose not limiting the scope of the invention.

BRIEF DESCRIPTION OF THE DRAWINGS

Referring to FIG. 1, the first polymerization zone (1) is set up inside a fluidized bed reactor. The monomers are fed through a distribution plate 4 and a fluidized polymer bed 1' is formed above the distribution plate 4. The polymer particles are maintained in a fluidization state by selecting the velocity of the fluidizing gas at a value well below the transport velocity of the polymer particles. A portion of the polymer particles growing in the upper region of the fluidized bed 1' enters a pipe 2' placed in vertical position, preferably coaxially with the fluidized bed reactor, and flows downward through it. In this second polymerization zone (2) the growing polymer particles flow downward in a densified form under the action of gravity. When the polymer particles reach the bottom of the vertical pipe 2', they enter a third polymerization zone (3). The third polymerization zone (3) is set up into a pipe 3' placed externally to the fluidized bed reactor, said pipe 3' connecting the bottom of the pipe 2' with the fluidized bed reactor at a point situated above the fluidized bed 1'. In said third polymerization zone (3) fast fluidization or transport conditions are involved, so that the polymer particles flow upward through said polymerization zone and are then reintroduced into the first polymerization zone (1).

Figure 1:
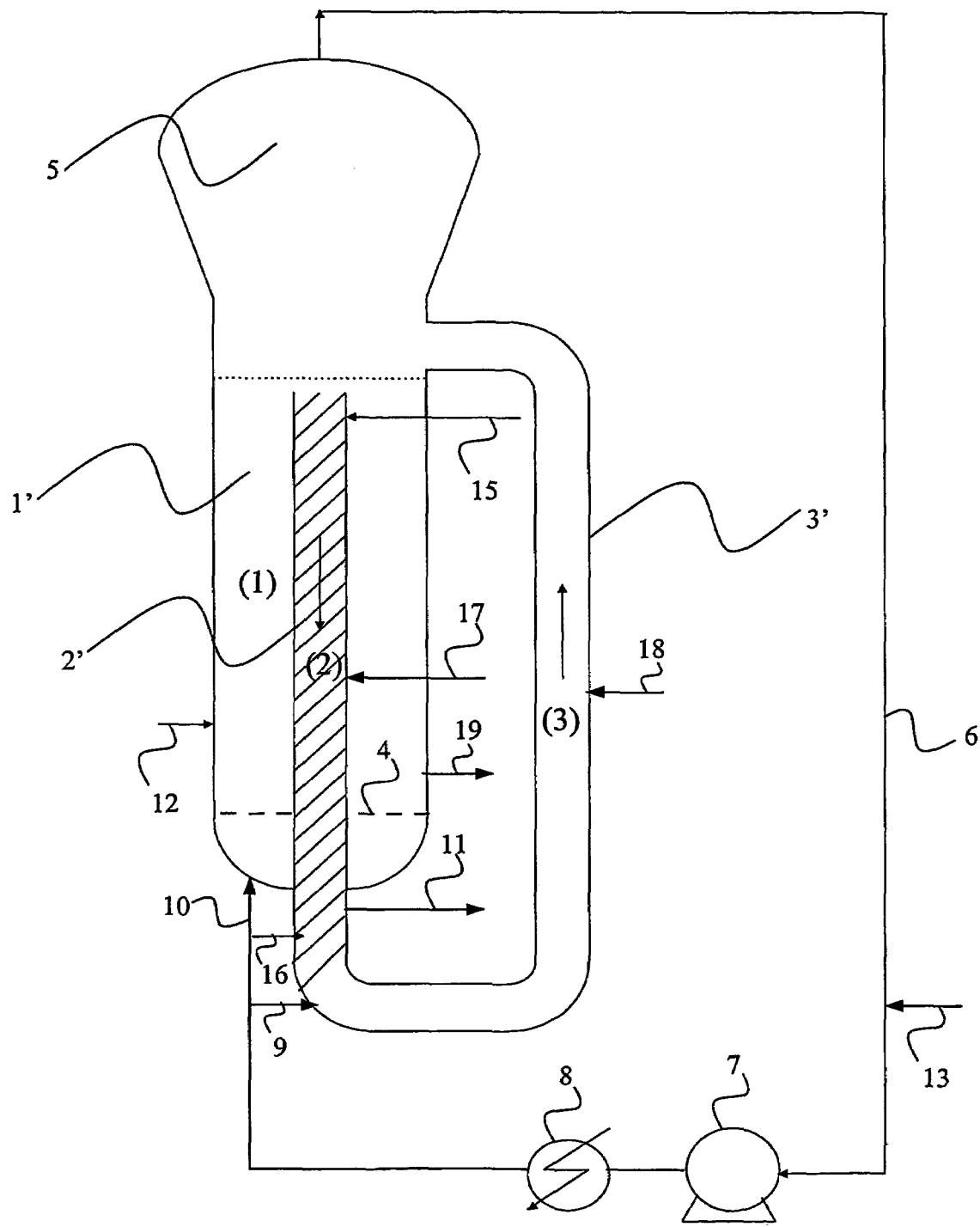
FIG. 1 is a diagrammatic representation of a first embodiment of the process according to the invention.

The three polymerization zones (1), (2) and (3) of FIG. 1 are interconnected each other and the material balance is maintained by feeding monomers and catalysts to the reactor and discharging polymer from the reactor.

Generally, the condition of fast fluidization in the third polymerization zone (3) is established by feeding a gas and/or liquid mixture through a line 9 placed at the bottom of the second polymerization zone (2). Said gas mixture is fed in the same direction of the polymer flow and comes from the recycle line 6 of the fluidizing gas to the reactor. The gas mixture fed through line 9 permits also the transfer of the polymer particles from the second polymerization zone (2) to the third polymerization zone (3).

The velocity of the gas mixture injected through line 9 has to be higher than the transport velocity under the operating conditions existing in the third polymerization zone (3) and depends on the gas density and the particle size distribution of the solid.

The control of the polymer circulating between the three polymerization zones can be effected by metering the amount of polymer leaving the second polymerization zone (2). This can be done by using means suitable for controlling the flow of solids such as, for example, mechanical valves (slide valve, butterfly valve, V-ball valve, etc.) or non-mechanical valves (L valve, J valve, reverse seal, etc.).

Above the first polymerization zone (1) the reactor body includes a velocity reduction zone 5 which is generally of increased diameter compared to the diameter of the fluidized bed portion of the reactor. The gaseous reaction mixture leaving the top of the velocity reduction zone 5 is the recycle gas stream 6, which is primarily comprised of unreacted monomer. The recycle gas stream 6 may also include inert condensable gases, such as isopentane, as well as inert non-condensable gases, such as nitrogen. The recycle gas stream 6 is compressed, cooled and transferred, if appropriate with addition of make-up monomers and/or molecular weight regulators and/or inert gases, to the first polymerization zone (1) via the line 10 which provides the gaseous monomer fluidizing the polymer bed 1'. The recycle line 6 is equipped with means for the compression 7 and cooling 8 and a line 13 for feeding monomers, molecular weight regulators and, optionally inert gases. A part of the gaseous mixture leaving the velocity reduction zone 5 is fed, after having been compressed and cooled, to the bottom of the second polymerization zone (2) through the line 9 with a velocity suitable to transfer the polymer particles from the second polymerization zone (2) to the third polymerization zone (3) and to establish fast fluidization or transport conditions in the third polymerization zone (3).

Means for cooling the reaction gases can be placed at any suitable point, according to the knowledge of the skilled in the art. For example, a jacket heat exchanger can be placed around any of the polymerization zones to better control the temperature profile therein. Generally, the various catalyst components are fed to the first polymerization zone (1) through a line 12 that is preferably placed in the lower part of the fluidized bed 1'.

The polymer can be discharged through a line 11 advantageously placed at the bottom of the second polymerization zone (2), where the polymer particles flow in a more packed form, so to minimize the quantity of entrained gas. By inserting a control valve at a suitable point upstream of the exit region of the polymer from the second polymerization zone (2), it becomes possible to continuously control the withdrawal of the polymer produced.

It is also possible to place a discharge line 19 in the lower part of the first polymerization zone (1) in order to have a secondary line from which the polymer can be discharged. Conveniently, the gas mixture present in the first polymerization zone is partially prevented from entering the second polymerization zone by introducing a gas and/or liquid mixture of different composition through one or more introduction lines placed preferably at a point close to the upper limit of the volume occupied by the densified solid flowing inside the pipe 2'. According to the embodiment of FIG. 1, this effect is carried out by feeding a gas and/or liquid into the second polymerization zone (2) through a line 15, placed preferably in the upper part of the second polymerization zone (2). The gas and/or liquid mixture to be fed through the line 15 should have an appropriate composition, different from that of the gas mixture present in the first polymerization zone (1). The said gas and/or liquid mixture partially or totally replaces the gas mixture reacting in the first polymerization zone (1). The flow rate of the gas mixture fed through line 15 can be regulated so that a flow of gas counter-current to the flow of polymer particles is originated in the second polymerization zone (2), particularly at the top thereof, thus acting as a barrier to the gas mixture coming from the fluidized bed 1'. It is also possible to place several feed lines 17 in the second polymerization zone (2) at different heights, in order to better control the gas-phase composition throughout said polymerization zone. The composition of the gas and/or liquid introduced through these feed lines can be the same or differ from that of the stream introduced by line 15. These additional feed lines, as well as line 15, can be used to introduce inert components or condensed monomers. Their evaporation in the second polymerization zone (2) contributes to remove the heat of reaction, thus allowing to control the temperature profile in a reliable way.

Likewise, the gas mixture flowing downward along the second polymerization zone (2) can be partially prevented to enter the third polymerization zone (3). This can be achieved by feeding a gas and/or liquid mixture through a line 16 placed generally at the bottom of the second polymerization zone (2). Said gas and/or liquid mixture to be fed through line 16 should have an appropriate composition, different from that of the gas mixture present in the second polymerization zone (2). The flow rate of this gas feed can be regulated to increase the local pressure in the terminal section of the second polymerization zone (2), thereby decreasing the flow of gas flowing downwards in the second polymerization zone (2), thus acting as a barrier to the gas mixture coming from the second polymerization zone (2). Furthermore, the introduction of said gas stream via line 16 allows to better control the polymer flow between the bottom of the second polymerization zone (2) and the inlet of the third polymerization zone (3). The presence of line 16 is also advantageous for the control of the process, in particular of the flow of recirculated polymer. The gas to be introduced through line 16 may be taken from the recycle line 6, preferably downstream the cooling means 8. It is also possible to place several feed lines 18 along the third polymerization zone (3) at different heights, in order to better control the gas-phase composition throughout said polymerization zone. The composition of the gas and/or liquid introduced through these feed lines can be the same or differ from that of the stream introduced by line 16.

As it can be easily understood from the embodiment shown in FIG. 1, the polymerization process of the present invention allows to greatly improve the homogeneity level of the obtained polyolefins and therefore to expand the range of polymer properties. In fact, by the continuous circulation of the polymer particles through three distinct reaction environments, the product homogeneity is maximized by minimizing the polymer domains (of different polymer type) within the particles.

Figure 2:
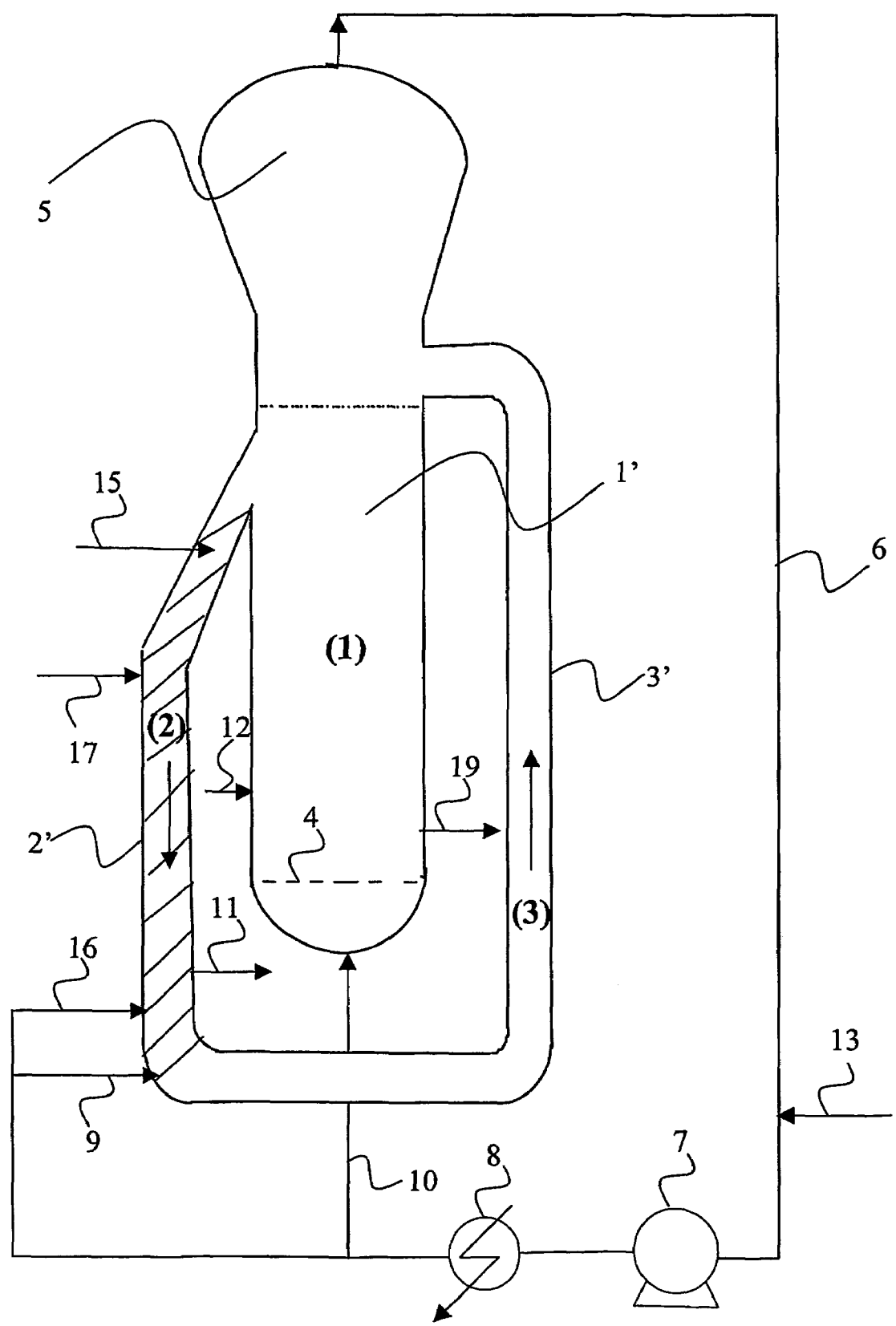
FIG. 2 is a diagrammatic representation of a second embodiment of the process according to the invention.

Referring now to the embodiment of FIG. 2, the first polymerization zone (1) is set up in a fluidized bed reactor. The monomers are fed through a distribution plate 4 and a fluidized polymer bed 1' is formed above the distribution plate 4. The growing polymer particles are maintained in a fluidization state by selecting the velocity of the fluidizing gas at a value well below the transport velocity of the polymer particles. A portion of the polymer particles growing in the upper region of the first polymerization zone (1), leaves the fluidized bed 1' through an opening in the wall of the reactor, enters a pipe 2' running outside the fluidized bed reactor and flow downward through it. The inlet of said pipe 2' is placed on one side of the fluidized bed 1' and the pipe 2' has preferably a circular cross section although other shapes, for example that of a regular polygon, are also suitable. In this second polymerization zone (2) the growing polymer particles flow downward in a densified form under the action of gravity. The initial portion of the pipe 2' is substantially tilted with respect to the reactor wall to allow the introduction of the polymer particles therein, while the remaining portion of the pipe 2' is substantially vertical. At the bottom of the pipe 2' the growing polymer particles are introduced into a third polymerization zone (3).

The third polymerization zone (3) is set up into a pipe 3' running outside the fluidized bed reactor, said pipe 3' connecting the bottom of pipe 2' with the fluidized bed reactor at a point situated above the fluidized bed 1'. In said third polymerization zone (3) fast fluidization or transport conditions are involved, so that the polymer particles flow quickly through said third polymerization (3) and are then reintroduced into the first polymerization zone (1). Generally, the condition of fast fluidization in the third polymerization zone (3) is established by feeding a gas and/or liquid mixture through a line 9, said gas mixture coming from the recycle line 6 of the fluidizing gas to the reactor. The gas mixture fed through line 9 permits also to transfer the polymer particles from the second polymerization zone (2) to the third polymerization zone (3).

The gaseous reaction mixture leaving the top of the velocity reduction zone 5 is the recycle gas stream 6, which is primarily comprised of unreacted monomer, but it may also include inert condensable gases or inert non-condensable gases. The recycle gas stream 6 is compressed, cooled and transferred, if appropriate with addition of make-up monomers and/or molecular weight regulators and/or inert gases, to the first polymerization zone (1) via the line 10 which provides the gaseous monomer fluidizing the polymer bed 1'. The recycle line 6 is equipped with means for the compression 7 and cooling 8 and a line 13 for feeding monomers, molecular weight regulators and, optionally inert gases. A part of the gaseous mixture leaving the velocity reduction zone 5 is fed, after having been compressed and cooled, to the bottom of the second polymerization zone (2) through the line 9 with a velocity suitable to transfer the polymer particles from the second polymerization zone (2) to the third polymerization zone (3) and to establish fast fluidization or transport conditions in the third polymerization zone (3).

Generally, the various catalyst components are fed to the first polymerization zone (1) through a line 12 that is preferably placed in the lower part of the fluidized bed 1'. The polymer can be discharged through a line 11 advantageously placed at the bottom of the second polymerization zone (2), where the polymer particles flow in a more packed form, so to minimize the quantity of entrained gas. It is also possible to place a discharge line 19 in the lower part of the first polymerization zone (1) in order to have a secondary line from which the polymer can be discharged.

Conveniently, the gas mixture present in the first polymerization zone is partially prevented from entering the second polymerization zone by introducing a gas and/or liquid mixture of different composition through one or more introduction lines, placed preferably at a point close to the upper limit of the second polymerization zone (2). According to the embodiment of FIG. 2, this effect is carried out by feeding a gas and/or liquid mixture into the second polymerization zone (2) through the line 15. The gas and/or liquid mixture to be fed through line 15 should have an appropriate composition, different from that of the gas mixture present in the first polymerization zone (1). The flow rate of line 15 can be regulated so that a flow of gas counter-current to the flow of polymer particles is originated in the second polymerization zone (2), particularly at the top thereof, thus acting as a barrier to the gas mixture coming from the fluidized bed 1'. It is also possible to place several feed lines 17 along the second polymerization zone (2) at different heights, in order to better control the gas-phase composition throughout said polymerization zone. The composition of the gas and/or liquid introduced through those feed lines can be the same or differ from that of the stream introduced by line 15. These additional feed lines, as well as line 15, can be used to introduce condensed monomers or inert components. Their evaporation in the second polymerization zone (2) contributes to remove the heat of reaction, thus allowing the control of the temperature profile in a reliable way.

Likewise, the gas mixture flowing downward along the second polymerization zone (2) can be partially prevented to enter the third polymerization zone (3). This can be achieved by feeding a gas and/or liquid mixture through a line 16 placed preferably at the bottom of the second polymerization zone (2). Said gas and/or liquid mixture to be fed through line 16 should have an appropriate composition, different from that of the gas mixture present in the second polymerization zone (2). The flow rate of this gas feed can be regulated to increase the local pressure in the terminal section of the second polymerization zone (2), thereby decreasing the flow of gas flowing downwards in the second polymerization zone (2), thus acting as a barrier to the gas mixture coming from the second polymerization zone (2). Furthermore, the introduction of said gas stream via line 16 allows to better control the polymer's flow between the bottom of the second polymerization zone (2) and the inlet of the third polymerization zone (3). The gas to be introduced through line 16 may be taken from the recycle line 6, preferably downstream the cooling means 8.

Figure 3:
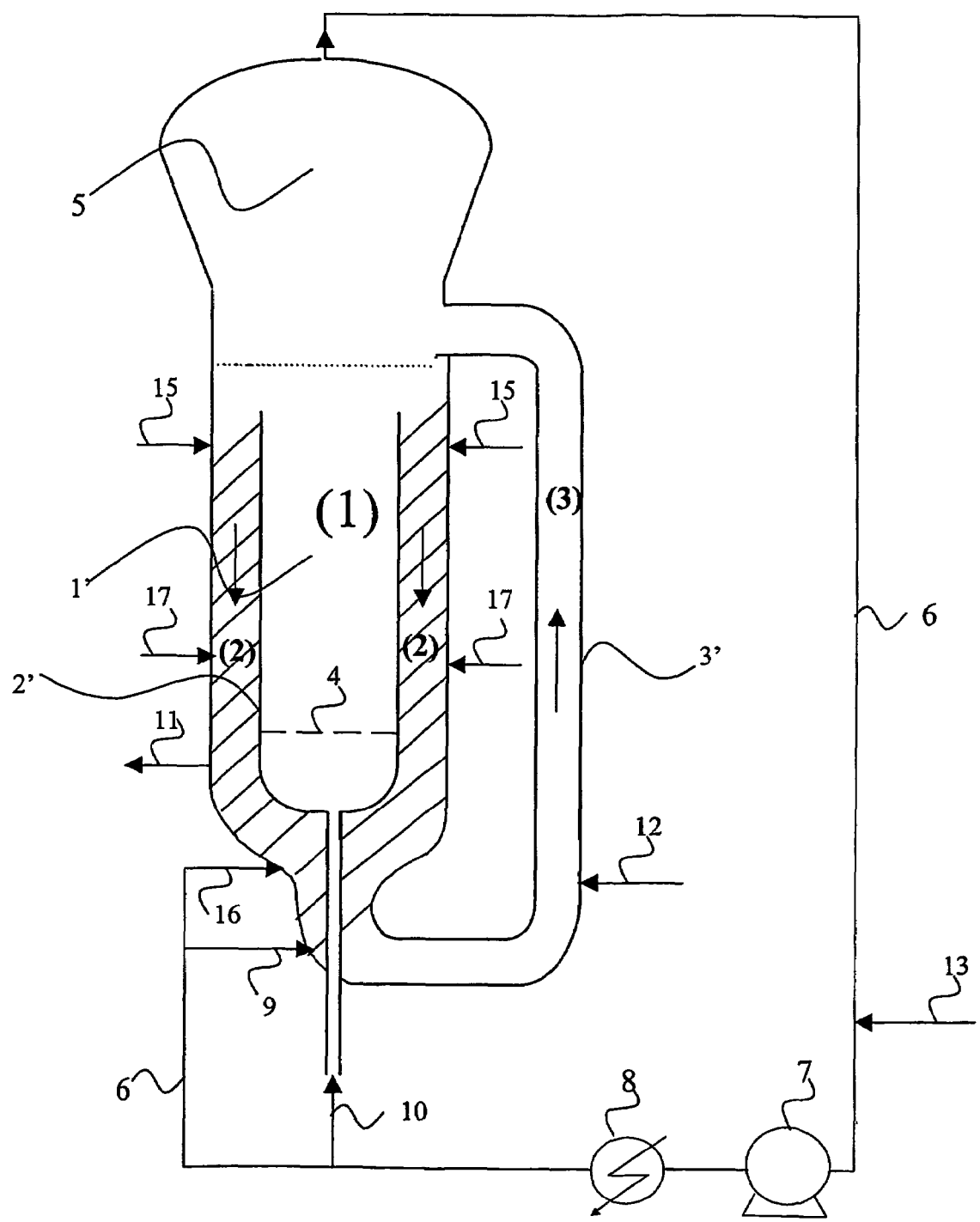
FIG. 3 is a diagrammatic representation of a third embodiment of the process according to the invention.

Referring now to the embodiment of FIG. 3, the first polymerization zone (1) is set up in a fluidized bed reactor. The monomers are fed through a distribution plate 4 and a fluidized polymer bed 1' is formed above the distribution plate 4. The growing polymer particles are maintained in a fluidization state by selecting the velocity of the fluidizing gas at a value well below the transport velocity of the polymer particles. A portion of the polymer particles growing in the upper region of the fluidized bed 1' enters an annular chamber formed between a vessel 2', placed inside the first polymerization zone (1), preferably coaxial with the fluidized bed reactor. According to this embodiment, said annular chamber represents the second polymerization zone, wherein the polymer particles flow downward in a densified form under the action of gravity. When the polymer particles reach the bottom of said annular chamber, they enter the third polymerization zone (3). Said polymerization zone is set up into a pipe 3' placed outside the fluidized bed reactor, said pipe 3' connecting the bottom of the annular chamber with the fluidized bed reactor at a point situated above the fluidized bed 1'. In said third polymerization zone (3) fast fluidization or transport conditions are established, so that the polymer particles flow upward through said third polymerization (3) and are then reintroduced into the first polymerization zone (1). Generally, the condition of fast fluidization in the third polymerization zone (3) is established by feeding a gas and/or liquid mixture through a line 9, said gas mixture coming from the recycle line 6 of the fluidizing gas to the reactor. The gas mixture fed through line 9 permits also the transfer of the polymer particles from the second polymerization zone (2) to the third polymerization zone (3).

The gaseous reaction mixture leaving the top of the velocity reduction zone 5 is the recycle gas stream 6, which is primarily comprised of unreacted monomer, but it may also include inert condensable gases, as well as inert non-condensable gases. The recycle gas stream 6 is compressed, cooled and transferred, if appropriate with addition of make-up monomers and/or molecular weight regulators and/or inert gases, to the first polymerization zone (1) via the line 10 which provides the gaseous monomer fluidizing the polymer bed 1'. The recycle line 6 is equipped with means for the compression 7 and cooling 8 and a line 13 for feeding monomers, molecular weight regulators and, optionally inert gases. A part of the gaseous mixture leaving the velocity reduction zone 5 is fed, after having been compressed and cooled, to the bottom of the second polymerization zone (2) through the line 9 with a velocity suitable to transfer the polymer particles from the second polymerization zone (2) to the third polymerization zone (3) and to establish fast fluidization or transport conditions in the third polymerization zone (3).

According to the embodiment of FIG. 3 the various catalyst components are preferably fed to the third polymerization zone through a line 12 that is preferably placed in the lower part of the pipe 3'.

The polymer can be discharged through one or more lines 11 advantageously placed at the bottom of the annular chamber of the second polymerization zone (2) where the polymer particles flow in a more packed form, so to minimize the quantity of entrained gas.

Conveniently, the gas mixture present in the first polymerization zone is partially prevented from entering the second polymerization zone by introducing a gas and/or liquid mixture of different composition through one or more introduction lines, placed preferably in the upper part of the annular chamber. According to the embodiment of FIG. 3, this effect can be carried out by feeding a gas and/or liquid into the annular chamber through a line 15 equipped with one or more feeding points along the circumference of the annular chamber. The gas and/or liquid mixture to be fed through the line 15 should have an appropriate composition, different from that of the gas mixture present in the fluidized bed 1'. The flow rate of line 15 can be regulated so that a flow of gas countercurrent to the flow of polymer particles is originated in the second polymerization zone (2), particularly at the top thereof, thus acting as a barrier to the gas mixture coming from the fluidized bed 1'. It is also possible to place several lines 17 into the annular chamber at different heights, in order to better control the gas-phase composition throughout the second polymerization zone. Likewise, the gas mixture flowing downward along the second polymerization zone (2) can be partially prevented to enter the third polymerization zone (3). This can be achieved by feeding a gas and/or liquid mixture through a line 16 placed preferably at the bottom of the annular chamber. Said gas and/or liquid mixture to be fed through line 16 should have an appropriate composition, different from that of the gas mixture present in the annular chamber. The presence of line 16 is also advantageous for the control of the process, in particular of the flow of recirculated polymer. The gas to be introduced through line 16 may be taken from the recycle line 6, preferably downstream the cooling means 8.

Figure 4:
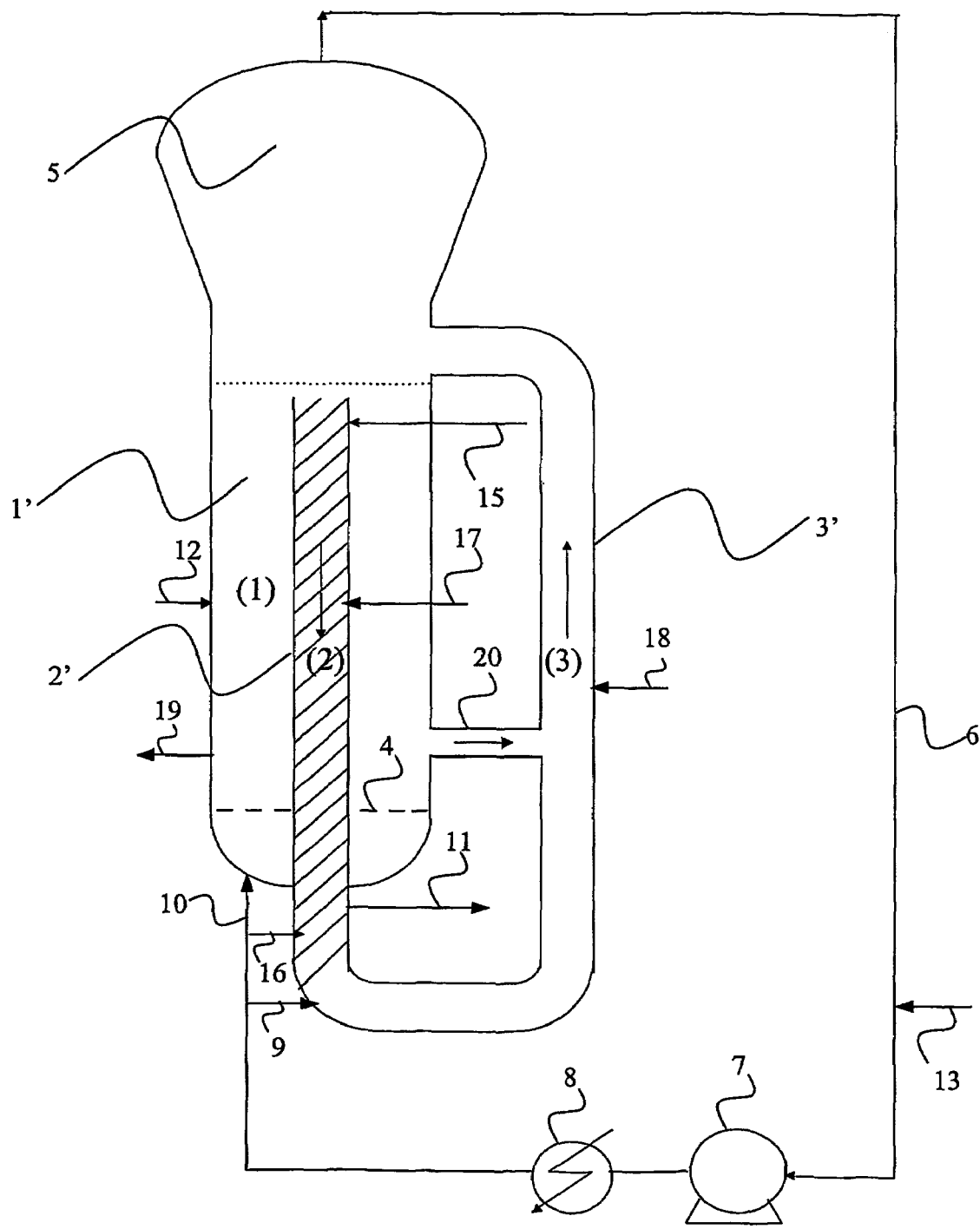
FIG. 4 is a diagrammatic representation of a further embodiment of the process according to the invention.

With reference to the embodiment of FIG. 4, the scheme of FIG. 1 is slightly modified by the addition of a connection pipe 20 which connects directly the bottom of the fluidized bed 1' to the pipe 3'. In this way, some polymer particles growing inside the first polymerization zone (1) enter directly the third polymerization zone (3) by-passing the second polymerization zone (2). The presence of the pipe 20 improves the solid mixing and circulation in the lower region of the fluidized bed 1'. Moreover, the presence of said pipe 20 favours the heat exchange between the different polymerization zones and increases the homogeneity of the polymeric products obtained by the process of the invention.

Figure 5:
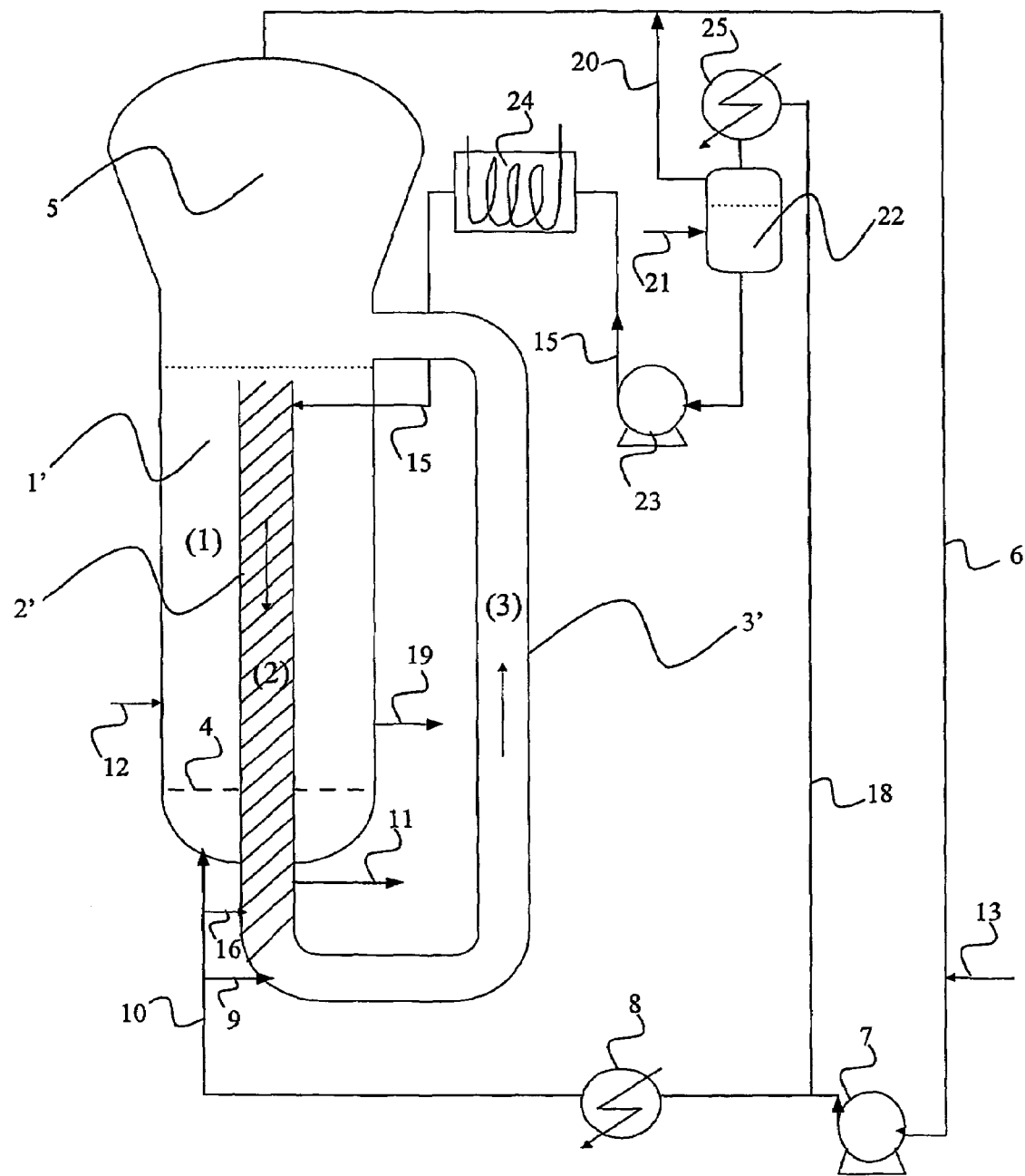
FIG. 5 is a diagrammatic representation in which the embodiment of FIG. 1 is further illustrated.

With reference to FIG. 5, a process scheme is shown which is applied to the embodiment of FIG. 1. This process scheme is advantageous to be employed when the volatility of the components fed as barrier stream (through line 15) and of those which must be prevented from entering the second polymerization zone (2) is considerably different, more precisely, when the latter are the most volatile. This scheme is particularly suitable when the polymerization process of the invention is used to produce polyolefins having a broad molecular weight and hydrogen is used as molecular weight regulator.

After the hydrogen-containing recycle stream of line 6 has been compressed by the compressor 7, a part thereof is sent through line 18 to a condenser 25, where it is cooled to a temperature at which the monomer(s) and the optional inert hydrocarbon component(s) condense. The solubility of the hydrogen in the liquid is then low enough that the liquid obtained is suitable to be fed through line 15 into the upper part of the second polymerization zone (2) as indicated in FIG. 5. A separation vessel 22 is also preferably present downstream of the condenser 25. The separated gaseous mixture, enriched in hydrogen, is advantageously recirculated through line 20 to the recycle line 6. When this scheme is adopted, the make-up components that must be present in the second polymerization zone (2) may be fed at any suitable point directly into line 15. A suitable point of introduction for components in the liquid state is directly into the vessel 22 through line 21. The liquid barrier can be fed into the second polymerization zone by gravity placing vessel 22 at a convenient height or by any suitable means, such as a pump 23. According to a preferred embodiment of the process scheme described in FIG. 5, the introduction of the barrier stream is such that the upper part of the second polymerization zone (2) acts as a stripping column to further remove the volatile component, e.g. $H_2$, from the gas stream flowing downward along the second polymerization zone (2). The barrier stream is fed through line 15 in the liquid state. The heat necessary for the stripping process is continuously supplied by the polymer particles coming from the fluidized bed 1', since they develop their heat of polymerization. It is apparent that the temperature of the polymer particles must be above the boiling point of the liquid fed through line 15. A way to achieve this is to operate at a temperature high enough in the first polymerization zone (1). By carefully balancing the flow of the solid through the section of inlet in the second polymerization and the amount of liquid fed through line 15, the partial evaporation of the barrier stream gives rise to a gas flowing upwards towards the velocity reduction zone 5, where it will be sent to line 6. The hydrogen content of the liquid flowing downwards decreases as it goes down to the lower sections, as it happens in a normal packed-bed distillation column. The liquid mixture, made sufficiently hydrogen-free, flows together with the solid particles along the second polymerization zone (2), where it gradually evaporates. A heater 24 can also be foreseen over line 15 to provoke a partial evaporation of the liquid to be fed into the second polymerization zone (2), so that a $H_2$-enriched gas is already generated to facilitate the removal of $H_2$ and the successive fractionation. Any suitable combination of heaters, condensers and fractionating devices over line 15 clearly falls within the spirit of the present invention.

The embodiment described in FIG. 5 is also suited for other processes than the production of broad MWD polymers. It can be used, for instance, to produce blends of a propylene homopolymer and a random copolymer of propylene with ethylene. In this case, the same scheme applies with ethylene being the volatile component, so that the propylene homopolymer is produced in the second polymerization zone (2). This scheme can also be applied when a heavier component must be present in higher concentration in the second polymerization zone; for example, when a propylene homopolymer or copolymer with low 1-butene content must be prepared in the first polymerization zone (1), while a propylene copolymer with higher 1-butene content must be prepared in the second polymerization zone (2). In particular, the upper portion of the second polymerization zone (2) can be used as a 1-butene enrichment section for the liquid mixture that flows downward to the second polymerization zone (2).

Another example of application of this embodiment is when ethylene is (co)polymerised in the presence of a less volatile inert, such as propane, which can be condensed at the operating pressure and utilised as barrier fluid, to prevent hydrogen from entering the second polymerization zone (2). In this case ethylene can be reintroduced directly into the second polymerization zone (2) at different positions.

As regards the embodiments of FIGS. 1, 2, 3 and 4 two or more pipes 3' can connect the bottom of the second polymeration zone (2) to the upper region of the first polymerization zone. Likewise, the embodiment of FIG. 2 can comprise two or more pipes 2' so that the particular reaction conditions of the second polymerization zone (2) are more times repeated.

Any type of suitable catalyst can be used in the polymerization process of the invention, since it is not important the particular physical state of the catalyst, and catalysts in either solid or liquid form can be used. For example, catalysts for the polymerization of olefins based on titanium, chromium, vanadium or zirconium can be used either in supported or unsupported form. Examples of catalysts that can be used are described in the patents U.S. Pat. No. 4,748,272, U.S. Pat. No. 4,302,566, U.S. Pat. No. 4,472,520 and U.S. Pat. No. 4,218, 339. Particularly suitable are the catalysts of controlled morphology, which are described in the patents U.S. Pat. No. 4,399,054, U.S. Pat. No. 5,139,985, EP-395,083, EP-553, 805, EP-553,806 and EP-601,525, and in general catalysts capable of giving polymers in the form of spheroidal particles having a mean dimension between 0.2 and 5 mm, preferably between 0.5 and 3 mm. The process of the present invention is particularly suitable for the use of metallocene catalysts, either in solution or supported. The various catalyst components can be introduced at the same point or at different points of the polymerization zones. The catalyst can be fed in either without prior treatment or in a prepolymerised form. In case other polymerization stages are situated upstream, it is also possible to feed the polymerization zones with a catalyst dispersed in a polymer suspension coming from an upstream bulk reactor, or a catalyst dispersed in a dry polymer coming from an upstream gas-phase reactor.

The polymer concentration in the reactive zones can be monitored by the usual methods known in the state of the art, for example by measuring the differential pressure between two suitable points along the axis of the polymerization zones or measuring the density by nuclear detectors (for example γ-rays).

The operating parameters such as, for example, temperature and pressure, are those that are usual in gas-phase catalytic polymerization processes. For example, the temperature in gas-phase processes for the polymerization of olefins is generally comprised between 50° C. and 120° C.

Advantageously, one or more inert gases are maintained in the polymerization zones, in such quantities that the sum of the partial pressures of the inert gases is preferably between 5 and 80% of the total pressure of the gases. The inert gas can be nitrogen or an aliphatic hydrocarbon having 2-6 carbon atoms, preferably propane. The presence of the inert gas has numerous advantages. It makes it possible to moderate the reaction kinetics while at the same time maintaining total reaction pressures sufficient to keep low the head of the circulation compressor. This assures an adequate mass flow rate for the heat exchange on the particle in the bed and, through the cooler on the circulating gaseous mixture, for the removal of the heat of reaction that has not been removed by the surfaces. Another advantage of the presence of the inert gas is that it allows limiting the temperature increase in the second polymerization zone (2), which runs in an essentially adiabatic mode.

The process of the present invention can advantageously be used for the preparation of a large number of olefin polymers. Examples of polymers that can be obtained are:

high-density polyethylenes (HDPEs having relative densities higher than 0.940) including ethylene homopolymers and ethylene copolymers with α-olefins having 3 to 12 carbon atoms;

linear polyethylenes of low density (LLDPEs having relative densities lower than 0.940) and of very low density and ultra low density (VLDPEs and ULDPEs having relative densities lower than 0.920 down to 0.880) consisting of ethylene copolymers with one or more α-olefins having 3 to 12 carbon atoms;

elastomeric terpolymers of ethylene and propylene with minor proportions of diene or elastomeric copolymers of ethylene and propylene with a content of units derived from ethylene of between about 30 and 70% by weight;

isotactic polypropylene and crystalline copolymers of propylene and ethylene and/or other α-olefins having a content of units derived from propylene of more than 85% by weight;

isotactic copolymers of propylene and α-olefins, such as 1-butene, with an α-olefin content of up to 30% by weight;

impact-resistant propylene polymers obtained by sequential polymerization of propylene and mixtures of propylene with ethylene containing up to 30% by weight of ethylene;

atactic polypropylene and amorphous copolymers of propylene and ethylene and/or other α-olefins containing more than 70% by weight of units derived from propylene;

polybutadiene and other polydiene rubbers.

A particularly interesting use of the presently claimed process is for the preparation of in-reactor made blends of polymers having different compositions. In fact, if the gas mixture introduced into the second polymerization zone (2) contains different monomer concentrations and/or types with respect to the gas-mixture present in the first and/or third polymerization zone, the product will be an intimate blend of polymer chains having different compositions. An example of application of this embodiment is the preparation of a blend of copolymers with different concentrations of the same comonomer into the polymerization zones according to the invention. By feeding a mixture free of the said comonomer into the second polymerization zone (2), the concentration of that comonomer therein will be lower than that in the first polymerization zone. Similarly, the concentration of that comonomer can be made different between the second and the third polymerization zone. Thus a blend of three different copolymers will be obtained.

It is another object of the present invention an apparatus for the gas-phase polymerization of olefins according to FIG. 1, said apparatus comprising:

a fluidized bed reactor having a reaction chamber 1', a distribution plate 4 placed below said reaction chamber and a velocity reduction zone 5 placed above said reaction chamber, a vertical pipe 2' running inside said reaction chamber 1', a first end of said pipe 2' protruding from the bottom of the fluidized bed reactor, the other end of said pipe 2' extending up to the higher region of the reaction chamber, one or more pipes 3' running outside the fluidized bed reactor and connecting the bottom of the pipe 2' to the fluidized bed reactor at a point in the upper portion of said reaction chamber and below said velocity reduction zone 5.

The reactor chamber is equipped with a catalyst feed line 12, while the vertical pipe 2' is equipped at its top portion with a line 15 for feeding gas or liquid. The vertical pipe 2' is also equipped at its bottom portion with a polymer discharge line 11 and with a line 9 for introducing a gas mixture coming from the recycle line of the fluidizing gas to the fluidized bed 1'. The gas mixture fed through line 9 allows to establish fast fluidization conditions into the pipes 3'.

It is a further object of the present invention an apparatus for the gas-phase polymerization of olefins according to FIG. 2, said apparatus comprising:

a fluidized bed reactor having a reaction chamber 1', a distribution plate 4 placed below said reaction chamber and a velocity reduction zone 5 placed above said reactor chamber, one or more pipes 2' running outside the fluidized bed reactor and extending downward from an opening in the higher region of the reaction chamber, one or more pipes 3' connecting the bottom of said pipes 2' to the fluidized bed reactor at a point in the upper portion of said reaction chamber and below said velocity reduction zone 5. The pipes 2' and 3' have preferably a circular cross section and form a loop outside and around the fluidized bed reactor, the inlet portion of pipe 2' being preferably slightly tilted with respect to the wall of the fluidized bed reactor. Moreover, the inlet portion of said loop can be equipped with a line for feeding a gas or liquid mixture.

A still further object of the present invention is an apparatus for the gas-phase polymerization of olefins according to FIG. 3, said apparatus comprising:

a fluidized bed reactor having a reactor chamber 1', a distribution plate 4 placed below said reactor chamber and a velocity reduction zone 5 placed above said reactor chamber, a vessel 2' placed inside the fluidized bed reactor, coaxially to it, and replicating its shape so to form an annular chamber between its walls and those of the fluidized bed reactor, wherein the upper end of said vessel 2' extends up to a point in the upper portion of said reaction chamber while the bottom end extends up to a point situated below said velocity reduction zone, said vessel extending up to a point in the upper portion of the reaction chamber and below the velocity reduction zone, one or more pipes 3' running outside the fluidized bed reactor, the pipes 3' connecting the bottom of said annular chamber to the fluidized bed reactor at a point in the upper portion of said reaction chamber and below said velocity reduction zone 5.

The annular chamber can be equipped at its top portion with one or more lines 15 for feeding gas or liquid and at its bottom portion with a polymer discharge line 11. Furthermore, the annular chamber is equipped at its bottom portion thereof with one or more lines for introducing a gas and/or liquid mixture coming from the recycle line 6. For instance, the gas mixture fed through line 9 allows to establish fast fluidization conditions into the pipes 3'.

It must be noted that any conventional, currently used, fluidized bed reactor can be easily retrofitted according to the embodiments shown in FIGS. 1-5 in order to achieve the results of the polymerization process herewith described.

It must be also remarked that the apparatus for the gas-phase polymerization of olefins according to the present invention gives a higher specific productivity than that obtainable in a conventional fluidized bed. This is due to the fact that the formed polymer is continuously circulated and, in particular, is continuously transported between the different polymerization zones, so that the heat removal efficiency is higher than in a conventional fluidized bed.

Furthermore, the embodiments of the present invention are suitable to be operated in the so called "condensing mode", so that a further increase of the heat removal is accomplished by cooling the recycle gas stream to a temperature below its dew point to produce a two-phase gas-liquid mixture. According to this technique, the cooling capacity of the recycle stream is increased by both the vaporization of the condensed liquids entrained in the recycle stream and as a result of the increased temperature gradient existing between the entering recycle stream and the reactor.

The invention claimed is:

1. A process for a gas-phase catalytic polymerization of olefins carried out in a plurality of interconnected polymerization zones, the process comprising feeding at least one monomer to said polymerization zones in the presence of a catalyst under reaction conditions and collecting the polymer product from said polymerization zones, wherein polymer particles grow within a first polymerization zone where a fluidized bed is formed, and at least a part of said polymer particles leave said first polymerization zone to enter a second polymerization zone through which they flow downward, leave said second polymerization zone and enter a third polymerization zone through which they flow upward under fast fluidization or transport conditions, leave said third polymerization zone and are reintroduced into the first polymerization zone, thus establishing a circulation of polymer between the different polymerization zones.

2. The process according to claim 1, wherein the inlet of said second polymerization zone is placed in an upper region of said first polymerization zone below an upper limit of said fluidized bed.

3. The process according to claim 1, wherein in said second polymerization zone the polymer particles flow downward in a densified form under the action of gravity.

4. The process according to claim 2, wherein said second polymerization zone is set up inside a vertical pipe which is coaxial with said first polymerization zone.

5. The process according to claim 2, wherein said second polymerization zone is set up into a pipe running outside the first polymerization zone, the inlet of said pipe being directly connected to the upper region of said first polymerization zone.

6. The process according to claim 2, wherein said second polymerization zone is set up into an annular chamber formed between the walls of a fluidized bed reactor and a vessel placed inside and coaxial with said fluidized bed reactor.

7. The process according to claim 1, wherein the third polymerization zone is set up into a pipe running outside said first polymerization zone.

8. The process according to claim 1, wherein the polymer particles leaving said third polymerization zone are reintroduced into said first polymerization zone at a point situated above the upper limit of said fluidized bed.

9. The process according to claim 1, wherein fast fluidization conditions are established in said third polymerization zone by feeding a gas through a line placed at the inlet of said third polymerization zone.

10. The process according to claim 9, wherein in said third polymerization zone the gas superficial velocity is between 0.5 and 15 m/s.

11. The process according to claim 1, wherein a part of polymer particles growing inside said fluidized bed enters directly the third polymerization zone through a pipe connecting the lower region of said fluidized bed to said third polymerization zone.

12. The process according to claim 1, wherein at least one α-olefin, $CH_2=CHR$, where R is hydrogen or a hydrocarbon radical having 1-12 carbon atoms, is polymerized.

13. The process according to claim 1, wherein a gas mixture present in said first polymerization zone is partially prevented from entering said second polymerization zone by introducing at least one of a gas and a liquid mixture of composition different from the mixture present in the first polymerization zone through at least one introduction line placed in an upper part of said second polymerization zone.

14. The process according to claim 13, wherein the introduction of at least one of said gas and liquid mixture of different composition establishes a net gas flow upward at an upper limit of the second polymerization zone.

15. The process according to claim 13, wherein the upper part of said second polymerization zone acts as a stripping column to further remove the volatile components from a gas stream flowing downward along said second polymerization zone.

16. The process according to claim 13, wherein a liquid mixture is introduced in the upper part of said second polymerization zone.

17. The process according to claim 16, wherein the liquid mixture comprises a hydrogen content.

18. The process according to claim 1, wherein a gas mixture present in the second polymerization zone is partially prevented from entering the third polymerization zone by introducing at least one of a gas and a liquid mixture of composition different from the mixture present in the second polymerization zone, through at least one introduction line placed at least one of the bottom of said second polymerization zone and at the inlet of said third polymerization zone.

19. An apparatus for a gas-phase polymerization of olefins comprising:
   (a) a fluidized bed reactor having a reaction chamber, a distribution plate placed below said reaction chamber, a velocity reduction zone placed above said reaction chamber,
   (b) a vertical pipe running inside said reaction chamber, a first end of said vertical pipe protruding from the bottom of the fluidized bed reactor, the other end of said vertical pipe extending up to the higher region of the reaction chamber,
   (c) at least one pipe running outside said reactor chamber and connecting the bottom of said vertical pipe to the fluidized bed reactor at a point in the upper portion of said reaction chamber and below said velocity reduction zone.

20. The apparatus according to claim 19, wherein said vertical pipe is equipped at its top portion with a line for feeding gas or liquid.

21. The apparatus according to claim 19, wherein said vertical pipe is equipped at its bottom portion with a polymer discharge line and with a line for introducing a gas mixture coming from a recycle line.

22. An apparatus for a gas-phase polymerization of olefins comprising:
   (a) a fluidized bed reactor having a reaction chamber, a distribution plate placed below said reactor chamber, a velocity reduction zone placed above said reactor chamber,
   (b) at least one pipe running outside the fluidized bed reactor and extending downward from an opening in the higher region of the reaction chamber,
   (c) at least one pipe connecting the bottom of said at least one downward extending pipe to the fluidized bed reactor at a point in the upper portion of said reaction chamber and below said velocity reduction zone.

23. The apparatus according to claim 22, wherein said at least one pipe form a loop outside and around the fluidized bed reactor.

24. The apparatus according to claim 23, wherein the inlet portion of said loop is equipped with a line for feeding a gas or liquid mixture.

25. An apparatus for a gas-phase polymerization of olefins comprising:
   (a) a fluidized bed reactor having a reaction chamber, a distribution plate placed below said reaction chamber, a velocity reduction zone placed above said reaction chamber, a vessel placed inside the fluidized bed reactor, coaxially to it, and replicating its shape so to form an annular chamber between its walls and those of the fluidized bed reactor, wherein the upper end of said vessel extends up to a point in the upper portion of said reaction chamber while the bottom end extends up to a point situated below said velocity reduction zone,
   (b) at least one pipe running outside the fluidized bed reactor, said at least one pipe connecting the bottom of said annular chamber to the fluidized bed reactor at a point in the upper portion of said reaction chamber and below said velocity reduction zone.

26. The apparatus according to claim 25, wherein the annular chamber is equipped at its top portion with at least one line for feeding at least one of a gas and a liquid mixture.

27. The apparatus according to claim 25, wherein the annular chamber is equipped at its bottom portion with at least one line for introducing at least one of a gas and a liquid mixture coming from a recycle line.

28. An apparatus for a gas-phase catalytic polymerization of olefins carried out in a plurality of interconnected polymerization zones, the apparatus comprising:
   means for feeding at least one monomer to said polymerization zones in the presence of a catalyst under reaction conditions;
   means for collecting the polymer product from said polymerization zones, wherein polymer particles grow within a first polymerization zone where a fluidized bed is formed;
   means for moving at least a part of said polymer particles from said first polymerization zone to a second polymerization zone through which they flow downward;
   means for moving said polymer particles from said second polymerization zone and to a third polymerization zone through which they flow upward under fast fluidization or transport conditions;
   means for moving said polymer particles from said third polymerization zone to the first polymerization zone, thus establishing a circulation of polymer between the different polymerization zones.

29. The process according to claim 17, wherein as the liquid mixture goes down to the lower sections of the second polymerization zone, the hydrogen content of the liquid mixture decreases.

* * * * *